United States Patent [19]
Plunkett

[11] Patent Number: 6,089,572
[45] Date of Patent: Jul. 18, 2000

[54] THREE-LAYER GASKET WITH PRIMARY AND SECONDARY SEALING ELEMENT

[75] Inventor: Tom P. Plunkett, Bolingbrook, Ill.

[73] Assignee: Dana Corporation, Toledo, Ohio

[21] Appl. No.: 09/034,054

[22] Filed: Mar. 3, 1998

[51] Int. Cl.[7] .............................. F16J 15/08; F02F 11/00
[52] U.S. Cl. ............................................ 277/592; 277/595
[58] Field of Search ................................... 277/592, 594, 277/595

[56] References Cited

U.S. PATENT DOCUMENTS

| | | |
|---|---|---|
| 4,834,399 | 5/1989 | Udagawa et al. . |
| 4,861,046 | 8/1989 | Udagawa . |
| 4,867,462 | 9/1989 | Udagawa . |
| 4,898,396 | 2/1990 | Udagawa . |
| 4,938,488 | 7/1990 | Udagawa et al. . |
| 4,976,445 | 12/1990 | Udagawa . |
| 4,995,624 | 2/1991 | Udagawa et al. . |
| 5,062,649 | 11/1991 | Udagawa . |
| 5,076,595 | 12/1991 | Udagawa . |
| 5,255,926 | 10/1993 | Udagawa . |
| 5,277,434 | 1/1994 | Kestly et al. . |
| 5,395,128 | 3/1995 | Udagawa . |
| 5,431,418 | 7/1995 | Hagiwara et al. . |
| 5,449,181 | 9/1995 | Miyaoh . |
| 5,490,681 | 2/1996 | Plunkett et al. . |
| 5,522,604 | 6/1996 | Weiss et al. . |
| 5,560,623 | 10/1996 | Yoshino . |
| 5,634,646 | 6/1997 | Miyaoh . |
| 5,695,203 | 12/1997 | Udagawa . |
| 5,879,011 | 3/1999 | Takata et al. . |

*Primary Examiner*—Anthony Knight
*Assistant Examiner*—John L. Beres
*Attorney, Agent, or Firm*—Rader, Fishman & Grauer PLLC

[57] ABSTRACT

An improved three layer metal gasket is disclosed incorporating both primary and secondary combustion seals for increased combustion seal area durability. The gasket has three plates, a first plate, a second plate, and a third plate. The first and third plates have opposed sealing beads that form the secondary combustion seal. The first and second plates cooperate to position the primary combustion seal and the secondary combustion seal along a central axis such that in operation the opposed sealing beads compress equally, thereby further improving the durability of the combustion area of the gasket. The gasket may further include a fluid seal. Specialized coatings may be used to enhance the sealability of both primary and secondary combustion seals and the fluid seal.

17 Claims, 2 Drawing Sheets

THREE-LAYER GASKET WITH PRIMARY AND SECONDARY SEALING ELEMENT

FIELD OF THE INVENTION

The present invention relates to an improvement in multi-layer metal gaskets, and more particularly to three layer metallic gaskets that have both a primary and secondary combustion seal.

BACKGROUND OF THE INVENTION

Gaskets are often used to provide a seal between an engine block and a cylinder head of an internal combustion engine. Cylinder head gaskets typically extend around cylinder bores to provide a combustion seal, maintaining the high temperature gases of combustion within the cylinder bores. The gaskets may also serve to seal fluid flow openings such as coolant and oil openings to prevent undesirable mixing. However, internal combustion engines have recently been operated at increasingly higher engine speeds and with increasingly higher outputs. Therefore, more durable combustion seals are required.

To ensure a satisfactory sealing capacity for both the combustion and fluid seals, it has been known to provide a multi-layer metal gasket with specialized coatings to achieve both a wear resistance seal around the cylinder bores and an effective fluid seal around fluid flow openings. Such gaskets have a high temperature coating with a low coefficient of friction applied around the cylinder bores and an elastomeric coating applied around fluid flow openings. However, gaskets of these types are often expensive and difficult to manufacture, as the coatings are selectively applied to only portions of a side of a particular gasket layer. Therefore it becomes necessary to employ masking techniques, which add production steps and limit the effectiveness of such gaskets.

To overcome the problems associated with masking, one known multi-layer gasket incorporates three plates wherein a particular coating is applied to specific layers of the gasket. A high temperature coating is used to enhance the seal around the combustion bore openings while an elastomeric seal coating is used to enhance the seal surrounding fluid flow openings. While such gaskets operate satisfactory, increased durability around the combustion seal is desired.

SUMMARY OF THE INVENTION

The present invention is directed to an improved three layer gasket for an internal combustion engine. The gasket incorporates three plates, each of the plates having first apertures for mating with cylinder bores of an engine block and second apertures to serve as fluid flow openings. The plates combine together to form at least two combustion seals, a primary combustion seal and a secondary combustion seal, and a fluid seal. The inclusion of both a primary and secondary combustion seal serves to increase the durability of the combustion seal area of the gasket without requiring excessive coatings or the addition of shims.

In the disclosed embodiment, a first plate has a first opening, a base portion, and three sealing beads. A first sealing bead is formed adjacent to the first opening to form a first portion of the primary combustion seal. A first leg of the first sealing bead is longer than the other leg so as to position a periphery of the plate downward relative to the base portion. A second sealing bead is formed radially outwardly of the first sealing bead to form a first portion of the secondary combustion seal. A third sealing bead is formed adjacent to the second opening to form a first portion of a fluid seal.

A second plate is disposed adjacent an outer surface of the first plate and has a body portion, an offset portion, a curved portion that extends around the periphery of the first plate and away from the offset portion, and a flange that extends away from the curved portion, the flange being spaced away from and generally parallel to the offset portion. A downward angled arm extending from the body portion positions the offset portion longitudinally downward relative to the body portion. The curved portion, offset portion and flange form a second portion of the primary combustion seal. The angled arm is in parallel alignment with the first leg of the first plate first sealing bead such that a portion of the first sealing bead is captured between the flange and the offset portion to form the primary combustion seal. The second plate also includes a second opening that corresponds to and is generally aligned with the second opening of the upper plate to form a second portion of the fluid opening.

A third plate is disposed adjacent an outer surface of the second plate such that the second plate is disposed between the first and third plates. The second plate includes two beads, a first bead and a second bead. The first bead is generally aligned with and opposing the second bead of the first plate, to form the secondary combustion seal. The second bead is generally aligned with and opposing the third bead of the first plate to form the fluid seal.

The angled arm of the second plate cooperates with the first leg of the first sealing bead of the first plate to position the primary combustion seal, the secondary combustion seal and the fluid seal along a central axis. Thus, equal compression of all the seals is ensured when the gasket is bolted into place.

Preferably, the plates further include specialized coatings, a high temperature resistant coating and an elastomeric coating, to enhance the sealing areas. The first plate is coated on both sides with the elastomeric coating. The second plate is coated with the high temperature resistant coating on a bottom surface of the plate so as to coat the primary combustion seal. The third plate includes an elastomeric coating on a bottom surface of the plate.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
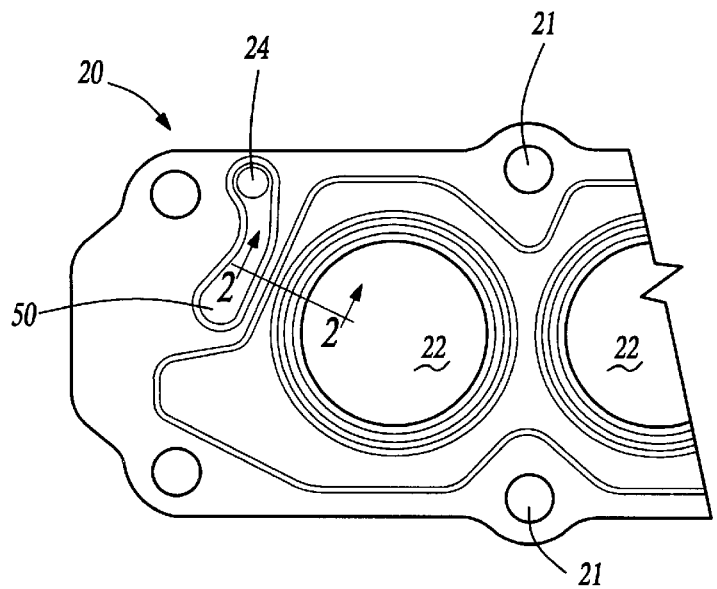
FIG. 1 is a planar view of a portion of a gasket incorporating the present invention.

FIG. 1 shows a gasket 20 for use with an internal combustion engine. Gasket 20 has a plurality of bolt holes 21 and first apertures 22 that are adapted to mate with cylinder bores of an engine block. Preferably, gasket 20 is also provided with second apertures 24 that serve as fluid flow openings for engine coolant and the like. Gasket 20 is constructed so as to provide at least two combustion seals, a primary combustion seal 26 and a secondary seal 28 around each first aperture 22. The inclusion of secondary combustion seal 28 advantageously increases the durability of the combustion seal area to prolong the wear life of gasket 20. Fluid seals 30 are provided around second apertures 24 to prevent undesirable mixing of engine fluids such as coolant and oil.

Figure 2:
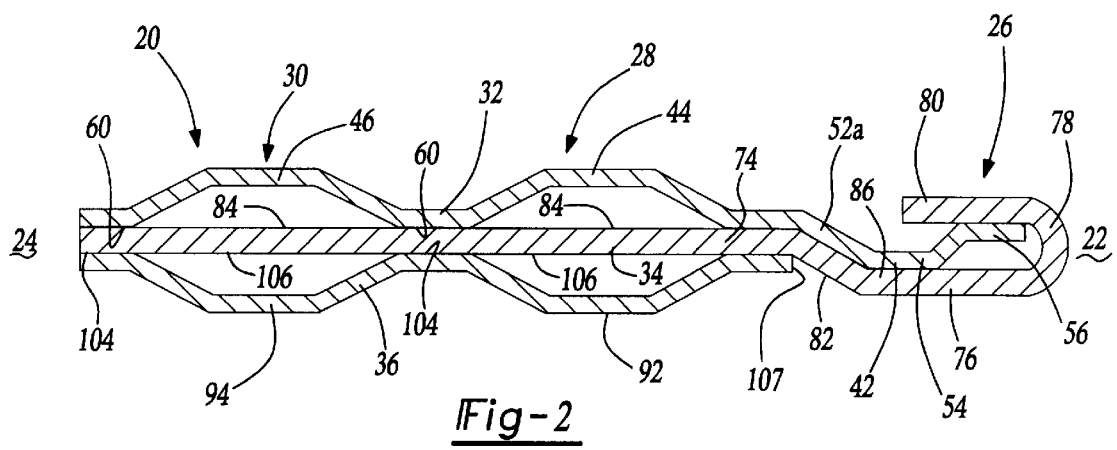
FIG. 2 is a cross-sectional view of an embodiment of the present invention taken along line 2—2 of FIG. 1.
Figure 3:
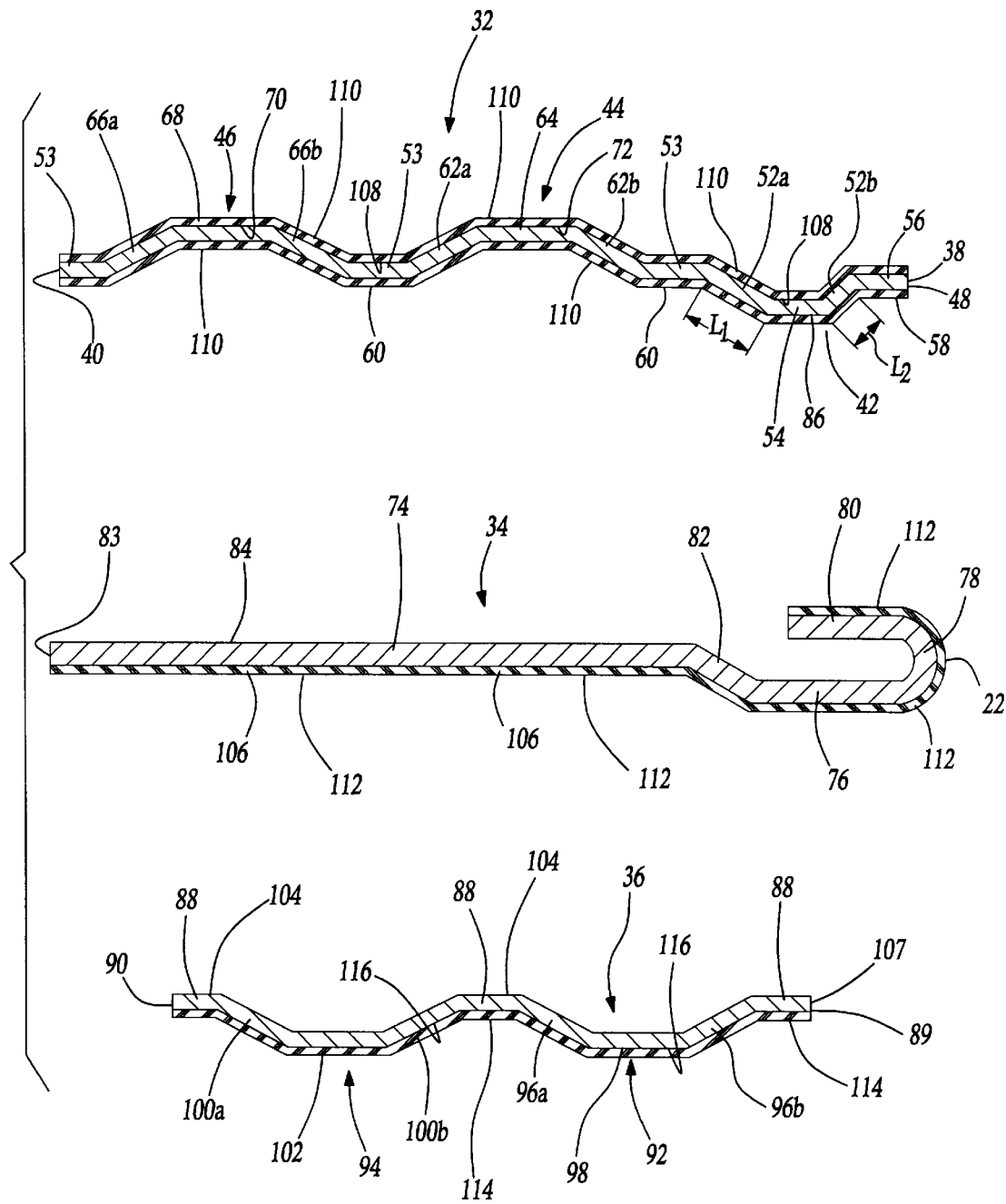
FIG. 3 is an exploded cross-sectional view of an embodiment of the present invention taken along line 2—2 of FIG. 1.

Referring to FIGS. 2 and 3, gasket 20 is constructed of three metal plates, a first plate 32, a second plate 34 and a third plate 36. Plates 32, 34 and 36 are assembled such that a section of second plate 34 is disposed between first plate 32 and third plate 36. Plates 32, 34 and 36 cooperate to form primary combustion seal 26, secondary combustion seal 28 and fluid seal 30. First plate 32 and third plate 36 are manufactured from a tempered material such as full hard SAE 301 stainless steel or springsteel. Preferably, first and third plates 32 and 36 have the substantially the same thickness in the range of approximately 0.15–0.30 mm.

Second plate 34 may be manufactured from a wide range of annealed stainless steel or low carbon steel. Second plate 34 is thicker than first and third plates 32 and 36, and has a thickness in the approximate range of 0.20–0.50 mm.

First plate 32 has a first opening 38, a second opening 40 and three integral sealing beads, 42, 44 and 46. First opening 38 is defined by a first plate end 48 and has a diameter that is slightly larger than the diameter of first aperture 22 in gasket 20. Second opening 40 is spaced away from first opening 38, such that sealing beads 42, 44 and 46 are disposed therebetween. Second opening 40 may be constructed so as to receive a separate sealing member 50 with a second aperture 24 disposed therein to serve as a fluid flow opening, as shown in FIG. 1.

A first sealing bead 42 is formed adjacent to first opening 38 and has angled legs 52a and 52b that define an apex 54. Leg 52a extends downward from a base portion 53 of first plate 32 and has a length $L_1$ that is greater than a length $L_2$ of leg 52b. Legs 52a and 52b are oriented so as to position apex 54 longitudinally downward relative to base portion 53. Adjacent to leg 52b is a flange portion 56 which carries first plate end 44. Due to length $L_2$ of leg 52b, a bottom surface 58 of flange portion 56 is preferably longitudinally positioned below a bottom surface 60 of base portion 53. First sealing bead 42 and flange portion 56 cooperate to form a first portion of primary combustion seal 26.

Figure 4:
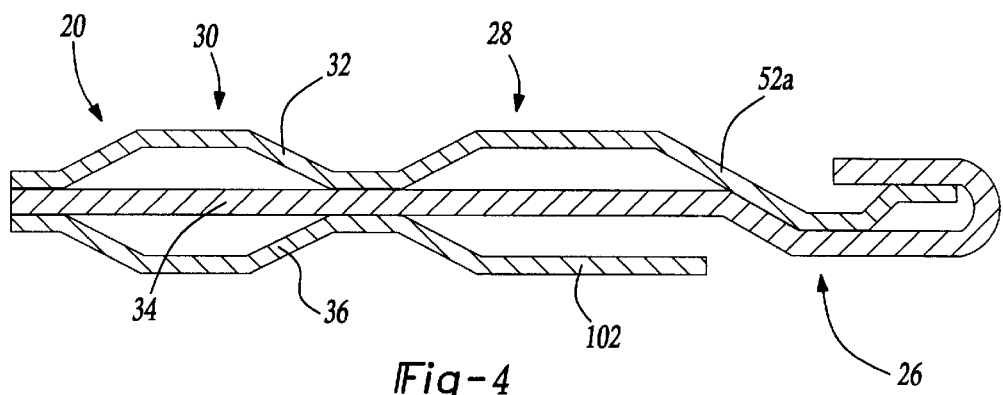
FIG. 4 is a cross-section view of an alternative embodiment of the present invention taken along line 2—2 of FIG. 1.

A second sealing bead 44 is formed adjacent to first sealing bead 42 such that second sealing bead 44 is spaced radially outwardly from first sealing bead 42 with a section of base portion 53 disposed therebetween. Second sealing bead 44 has angled legs 62a and 62b that define an apex 64. Legs 62a and 62b are substantially the same length and are oriented so as to position apex 64 upward relative to base portion 53. Second sealing bead 44 forms a first portion of secondary combustion seal 28. Alternatively, leg 52a could serve as a leg for both first sealing bead 42 and second sealing bead 44 such that there would be no base portion 53 disposed therebetween, as seen in FIG. 4.

A third sealing bead 46 is formed adjacent to second opening 40 such that second sealing bead 44 is disposed between first sealing bead 42 and third sealing bead 46. Third sealing bead 46 has angled legs 66a and 66b that define an apex 68. Legs 66a and 66b are oriented so as to position apex 68 upward relative to base portion 53 wherein a top surface 70 of apex 68 is in substantial alignment with a top surface 72 of apex 64. Third sealing bead 46 forms a first portion of fluid seal 30.

Second plate 34 has a substantially planar body portion 74, an offset portion 76, a curved portion 78 and a flange 80.

Offset portion 76 is positioned longitudinally downward from body portion 74 due to a downward angled arm 82 disposed between body portion 74 and offset portion 76. Curved portion 78 defines a periphery of aperture 22 and is adjacent offset portion 76. Further, curved portion 78 curves upward from offset portion 76 to space flange 80 away from and generally parallel to offset portion 76. Offset portion 76, curved portion 78 and flange 80 cooperate to form a second portion of primary combustion seal 26. Second plate 34 also includes an opening 83 which corresponds to and is in alignment with second opening 40 in first plate 32.

Second plate 34 is positioned adjacent first plate 32 wherein a top surface 84 of second plate 34 contacts bottom surface 60 of first plate 32, as shown in FIG. 2. Angled arm 82 is in parallel alignment with leg 52a such that a surface 86 of apex 54 is supported by offset portion 76. Flange 80 and curved portion 78 cooperate to capture flange portion 56 between flange 80 and offset portion 76, such that a portion of first sealing bead 42 of first plate 42 is disposed between flange 80 and offset portion 76, thereby forming primary combustion seal 26.

Third plate 36 includes a base portion 88, a first opening 89, a second opening 90, a first sealing bead 92 and a second bead 94. Opening 90 corresponds to and is in general alignment with openings 40 and 83 in first and second plates 32 and 34, respectively, so as to form second aperture 24 in gasket 20. First sealing bead 92, which forms a second portion of secondary combustion seal 28 is positioned adjacent to first opening 89. First sealing bead 92 has angled legs 96a and 96b that define an apex 98. Legs 96a and 96b orient apex 98 downward relative to base portion 88. Second sealing bead 94, which is adjacent to opening 90, has angled legs 100a and 100b that define an apex 102. Legs 100a and 100b orient apex 102 downward from base portion 88 to form a second portion of fluid seal 30.

Third plate 36 is positioned adjacent second plate 34 such that a top surface 104 of base portion 88 contacts a bottom surface 106 of second plate 34. First sealing bead 92 is positioned directly beneath and in alignment with second sealing bead 44 of first plate 32, such that sealing beads 44 and 92 are opposing, thereby forming secondary combustion seal 28. The addition of secondary combustion seal 28 increases the durability of the combustion area of gasket 20, thus increasing the wear life of gasket 20 and reducing overall engine production costs. Second sealing bead 94 is positioned directly beneath and in alignment with third sealing bead 46 of first plate 32 such that sealing beads 46 and 94 are opposing, thereby forming fluid seal 30.

Third plate 36 is sized such that a periphery 107 of first opening 89 of third plate 36 is positioned directly beneath where arm 82 of second plate 34 extends from body portion 74, such that third plate 36 does not overlap offset portion 76 of second plate 34. Alternatively, third plate 36 may terminate at apex 102, as seen in FIG. 3, thereby increasing the compression capability of secondary combustion seal 28.

When gasket 20 is bolted together, sealing stress is created around apertures 22 and 24. The presence of all sealing beads serve to further increase the sealing stress. Downward angled leg 52a of first plate 32 and angled arm 82 of second plate 34 cooperate to ensure that primary combustion seal 26, secondary combustion seal 28 and fluid seal 30 are all positioned along a central axis such that gasket 20 compresses evenly and thus ensuring a satisfactory seal.

Prior to the manufacture of gasket 20, plates 32, 34 and 36 may also be provided with certain coatings to enhance sealing at both the primary and secondary combustion seals 26 and 28, and fluid seals 30. In the preferred embodiment, first plate 32 is coated on both a top surface 108 and bottom surface 60 with an elastomeric coating 110, such as a rubber coating, which is approximately 0.025 mm thick on both surfaces 108 and 60.

Second plate 34 is preferably completely coated only on bottom surface 106 with a high temperature resistant coating 112, such as polytetrafluoroethylene ("PTFE") or molybedenum disulfide. Once second plate 34 is formed into the desired shape as shown in FIG. 3, coating 112 becomes disposed between flange 80 and the engine head (not shown), thereby reducing friction and improving sealability at primary combustion seal 26. Coating 112 has a preferred thickness between 0.010–0.020 mm with a more preferred thickness of approximately 0.125 mm.

Third plate 36 has an elastomeric coating 114 that is similar to that of coating 116 for first plate 32, with coating 114 being applied only on a bottom surface 116 of third plate 36.

While gasket 20 has been shown in a preferred orientation, it is understood that gasket 20 could be positioned such that first plate 32 is positioned on the bottom of gasket 20 without departing from the invention. Further, while full mechanical beads are shown, it is understood that other types of beads or other suitable seal elements may be used.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A gasket for use with an internal combustion engine, comprising:

a first metal plate having a base portion and a first plate opening that is offset longitudinally downward relative to said base portion, said first plate forming a first portion of a primary combustion seal and a first portion of a secondary combustion seal, said secondary combustion seal being positioned adjacent to said primary combustion seal and radially outwardly from said first plate opening;

a second metal plate disposed adjacent said first plate, said second plate having a body portion, an angle arm, an offset portion, a curved portion and a flange, wherein said angled arm is disposed between said body portion and said offset portion and offsets said offset portion longitudinally relative to said body portion, said curved portion defining a second plate opening and extending away from said offset portion, said flange extending away from said curved portion such that said flange is spaced away and generally parallel to said offset portion to form a second portion of said primary combustion seal; and a third metal plate having a third plate opening and forming a second portion of said secondary combustion seal, said third plate positioned adjacent to said second plate such that a portion of said second plate is disposed between said first plate and said third plate, said third plate opening having a diameter larger than that of said second plate opening and positioned such that said third plate is in a non-overlapping orientation with said offset portion of said second plate and said second portion of said secondary combustion seal being positioned adjacent to said third plate opening;

wherein said primary combustion seal is offset from said secondary combustion seal to insure equal compression of said second combustion seal and said primary combustion seal when said gasket is operatively positioned between mating components.

2. A gasket as recited in claim 1, wherein said second plate has a high temperature resistant coating on a bottom surface thereof for sealing around said first plate opening and enhancing said primary combustion seal.

3. A gasket as recited in claim 1, wherein said first plate includes a first sealing bead positioned adjacent to said first plate opening, wherein an angled leg from said first sealing bead offsets said periphery of said first plate opening downward relative to said base portion of said first plate.

4. A gasket as recited in claim 3, wherein a portion of said first sealing bead is captured between said flange and said offset portion of said second plate.

5. A gasket as recited in claim 3, wherein said first plate includes a second sealing bead positioned radially and outwardly from said first sealing bead, said second sealing bead having an apex that extends upward relative to said base portion.

6. A gasket as recited in claim 5, wherein said third plate includes a third plate sealing bead generally aligned with and opposing said second sealing bead of said first plate.

7. A gasket as recited in claim 6, wherein said third plate sealing bead terminates at an apex of said third plate sealing bead such that said apex is spaced and parallel from said body portion of said second plate.

8. A gasket as recited in claim 1, wherein said first, second and third plates have a generally uniform thickness, said first and third plates having a thickness less than a corresponding thickness of said second plate.

9. A gasket for use with an internal combustion engine, comprising:

a first metal plate having a base portion, a first opening, a second opening and at least three sealing beads, a first sealing bead being positioned adjacent to said first opening, a second sealing bead being positioned radially outwardly from said first sealing bead, a third sealing bead being positioned adjacent to said second opening, wherein an angled leg from said first sealing bead offsets a periphery of said first opening in a longitudinal direction relative to said base portion;

a second metal plate positioned adjacent to said first metal plate, said second plate having a first opening, a second opening, a body portion, an angled arm, an offset portion, a curved portion, and a flange, wherein said angled arm is disposed between said body portion said offset portion and offsets said offset portion longitudinally relative to said body portion, said angled arm being in parallel alignment with said leg of said first plate, said curved portion adjacent to said second plate first opening and extending away from said offset portion and around said periphery of said first plate first opening, said flange extending away from said curved portion such that said flange is spaced away and generally parallel to said offset portion, thereby capturing a portion of said first sealing bead of said first plate between said offset portion and said flange to form a primary combustion seal, said second opening of said second plate corresponding to and generally aligned with said first plate second opening; and a third metal plate having a first opening, a second opening, a first sealing bead, and a second sealing bead, said third plate positioned adjacent to said second plate and opposite said first plate so as to dispose a portion of said second plate between said first and third plates, said third plate being positioned such that said third plate first sealing bead is in alignment with and opposing said first plate second sealing bead and said third plate second sealing bead is in alignment with and opposing said first plate third sealing bead so as to form a secondary combustion seal and a fluid seal, respectively, said third plate first opening being sized so as to be in a non-overlapping orientation with said offset portion of said second plate, said third plate second opening corresponding to and generally aligned with said first and second plate second openings.

10. A gasket as recited in claim 9, wherein said first plate has an elastomeric coating on a top surface of said first plate to enhance fluid flow.

11. A gasket as recited in claim 10, wherein said first plate has an elastomeric coating on a bottom surface of said first plate such that when said first plate is positioned adjacent said second plate, said fluid seal is enhanced between said first and second plates.

12. A gasket as recited in claim 10, wherein said third plate has an elastomeric coating on a bottom surface of said third plate to enhance said fluid seal.

13. A gasket as recited in claim 9, wherein said second plate has a high temperature coating on a bottom surface of said second plate for sealing around said second plate first opening and enhancing said primary combustion seal.

14. A gasket as recited in claim 13, wherein said high temperature coating is polytetrafluoroethylene.

15. A gasket as recited claim 11, wherein said elastomeric coatings are rubber.

16. A gasket as recited in claim 9, wherein said first, second and third plates have a generally uniform thickness, said first and third plates having a thickness less than a corresponding thickness of said second plate.

17. A gasket for use with an internal combustion engine, comprising:

a first metal plate having a base portion, a first opening, a second opening and at least three sealing beads, a first sealing bead being positioned adjacent to said first opening, a second sealing bead being positioned radially outwardly from said first sealing bead, a third sealing bead being positioned adjacent to said second opening, wherein an angled leg from said first sealing bead offsets a periphery of said first opening in a longitudinal downward direction relative to said base portion, a first elastomeric coating being disposed on both a top and bottom surface of said first plate;

a second metal plate positioned adjacent to said first metal plate, said second plate having a first opening, a second opening, a body portion, an angled arm, an offset portion, a curved portion, and a flange, wherein said angled arm is disposed between said body portion and said offset portion and offsets said offset portion longitudinally downward relative to said body portion, said angled arm being in parallel alignment with said leg of said first plate, said curved portion adjacent to said second plate first opening and extending away from said offset portion and around said periphery of said first plate first opening, said flange extending away from said curved portion such that said flange is spaced away and generally parallel to said offset portion, thereby capturing a portion of said first sealing bead of said first plate between said offset portion and said flange to form a primary combustion seal, said second opening of said second plate corresponding to and generally aligned with said first plate second opening, a high temperature coating being disposed on a bottom surface of said second plate for sealing around said second plate first opening when said gasket is tightened to enhance said primary and secondary combustion seals, and a third metal plate having a first opening, a second opening, a first sealing bead, and a second sealing bead, said third plate positioned adjacent to said second plate and opposite said first plate so as to dispose a portion of said second plate between said first and third plates, said third plate being positioned such that said third plate first sealing bead is in alignment with and opposing said first plate second sealing bead and said third plate second sealing bead is in alignment with and opposing said first plate third sealing bead so as to form a secondary combustion seal and a fluid seal, respectively, said third plate first opening being sized so as to be in a non-overlapping orientation with said offset portion of said second plate, said third plate second opening corresponding to and generally aligned with said first and second plate second openings, and an elastomeric coating being disposed on a bottom surface of said third plate, said elastomeric coating of said third plate cooperating with said elastomeric coatings of said first plate to enhance said fluid seal.

* * * * *